United States Patent [19]
Takada

[11] Patent Number: 5,894,013
[45] Date of Patent: Apr. 13, 1999

[54] CATALYST FOR PURIFYING EXHAUST GAS

[75] Inventor: Toshihiro Takada, Toyota, Japan

[73] Assignee: Toyota Jidosha Kabushiki Kaisha, Aichi-ken, Japan

[21] Appl. No.: 08/919,115

[22] Filed: Aug. 28, 1997

[30] Foreign Application Priority Data

Sep. 2, 1996 [JP] Japan ................................. 8-232013

[51] Int. Cl.$^6$ ................................. B01D 53/34
[52] U.S. Cl. ................. 422/177; 422/177; 422/172; 422/180; 55/526; 55/DIG. 30; 60/303
[58] Field of Search .................. 422/177, 171, 422/211, 180, 222, 172; 55/523, DIG. 30; 423/213.2, 213.7, 239.1; 60/297, 303, 311

[56] References Cited

U.S. PATENT DOCUMENTS

| | | | |
|---|---|---|---|
| 4,857,089 | 8/1989 | Kitagawa et al. | 422/180 |
| 5,041,270 | 8/1991 | Fujitani et al. | 423/213.2 |
| 5,419,878 | 5/1995 | Honma | 422/177 |

FOREIGN PATENT DOCUMENTS

| | | |
|---|---|---|
| 0 148 358 A2 | 7/1985 | European Pat. Off. . |
| 0 277 012 A1 | 8/1988 | European Pat. Off. . |
| 605251 | 7/1994 | European Pat. Off. ............. 422/177 |
| 0 779 096 A1 | 6/1997 | European Pat. Off. . |
| 0 782 880 A1 | 7/1997 | European Pat. Off. . |
| 22 34 601 | 2/1973 | Germany . |
| 43 06 052 A1 | 9/1993 | Germany . |
| A 4-118030 | 4/1992 | Japan . |
| U 6-69317 | 9/1994 | Japan . |

*Primary Examiner*—Hien Tran
*Attorney, Agent, or Firm*—Oliff & Berridge, PLC

[57] ABSTRACT

A catalyst for purifying an exhaust gas includes a substrate, a catalyst carrier layer, a catalyst ingredient and a hydrocarbons supplier. The catalyst carrier layer is formed on the substrate. The catalyst ingredient is loaded on the catalyst carrier layer. The hydrocarbons supplier is disposed in the substrate, and supplies supplementary hydrocarbons into the catalyst carrier layer so as to securely react the supplementary hydrocarbons with $NO_x$ included in an exhaust gas. Hence, the catalyst can purify not only CO but also $NO_x$ over a wide temperature range.

9 Claims, 7 Drawing Sheets

CATALYST FOR PURIFYING EXHAUST GAS

BACKGROUND OF THE INVENTION

1. Field of the Invention

The present invention relates to a catalyst for purifying an exhaust gas. Specifically, it relates to a catalyst which can efficiently purify nitrogen oxides ($NO_x$), included in an exhaust gas, even if the exhaust gas contains oxygen more than necessary for oxidizing carbon monoxide (CO) and hydrocarbons (HC).

2. Description of the Related Art

As a catalyst for purifying an automotive exhaust gas, there has been employed a 3-way catalyst so far which oxidizes CO and HC and simultaneously reduces $NO_x$. For example, the 3-way catalyst has been known widely which comprises a honeycomb-shaped substrate formed of cordierite, or the like, a catalyst carrier layer formed of γ-alumina, or the like, and formed on the substrate, and a noble metal catalyst ingredient selected from the group consisting of platinum (Pt), palladium (Pd) and rhodium (Rh), and loaded on the catalyst carrier layer.

The purifying performance of the conventional exhaust gas purifying catalyst depends greatly on an air-fuel ratio of a fuel which is supplied to an engine. For example, when the air-fuel ratio (i.e., A/F ratio) is large, or when the air-fuel ratio is on a fuel-lean side (i.e., when a concentration of a fuel is small in an air-fuel mixture ), the content of oxygen is large in an exhaust gas emitted from the engine. Thus, the oxidizing reactions of purifying CO and HC are active, but the reducing reactions of purifying $NO_x$ are inactive. On the other hand when the air-fuel ratio is small, or when the air-fuel ratio is on a fuel-rich side (i.e., when a concentration of a fuel is large in an air-fuel mixture), the content of oxygen is small in an exhaust gas emitted from the engine. Thus, the oxidizing reactions are inactive, but the reducing reactions are active.

When driving an automobile, especially when driving an automobile in urban areas, the automobile is accelerated and decelerated frequently. Consequently, the air-fuel ratio varies frequently in the range of from the values adjacent to the stoichiometric point (air-fuel ratio: 14.6) to the fuel-rich side (i.e., in an oxygen-lean atmosphere). In order to satisfy the low fuel consumption requirement under the driving conditions such as in the above-described urban areas, it is necessary to operate an automobile on the fuel-lean side where the air-fuel mixture containing oxygen as excessive as possible is supplied to the engine. However, the thus lean-burn-controlled engine emits an exhaust gas which contains oxygen in a large amount. As a result, the reducing reactions of purifying $NO_x$ are inactive. Hence, it has been desired to develop an exhaust gas purifying catalyst which can satisfactorily purify $NO_x$ included in the exhaust gas which is emitted from the lean-burn-controlled engine, and which contains oxygen in a large amount.

Under the circumstances, a novel exhaust gas purifying catalyst was proposed, for example, in Japanese Unexamined Patent Publication (KOKAI) No. 4-118,030. This exhaust gas purifying catalyst employs a catalyst carrier layer formed of mordenite which has an HC adsorbing ability. When the temperature of an exhaust gas is low, the exhaust gas purifying catalyst adsorbs HC. When the temperature of the exhaust gas increases, the exhaust gas purifying catalyst releases HC. The released HC reduce $No_x$ included in the exhaust gas. As a result, the exhaust gas purifying catalyst can exhibit an improve $NO_x$ conversion.

Another novel exhaust gas purifying catalyst was proposed, for example, in Japanese Unexamined Utility Model Publication (KOKAI No. 6-69,317. As illustrated in FIG. 11, this exhaust gas purifying catalyst comprises a substrate 1, a catalyst carrier layer 2, and a catalyst ingredient (not shown), and is subjected to a supply of supplementary HC from an upstream side of an exhaust gas flow. The supplementary HC can be propylene, or the like. When an exhaust gas is in an oxygen-rich atmosphere, the supplementary HC are forcibly supplied to the exhaust gas purifying catalyst from an upstream side of an exhaust gas flow. Consequently, HC are compulsorily supplied to and absorbed on the catalyst carrier layer 2 so that the oxidizing reactions, which the absorbed HC effect, decrease the atmosphere around the active cites of the exhaust gas purifying catalyst down to the stoichiometric point (air-fuel ratio: 14.6). The exhaust gas purifying catalyst thus purifies $NO_x$, which are included in the exhaust gas of an oxygen-rich atmosphere.

The exhaust gas purifying catalyst proposed in Japanese Unexamined Patent Publication (KOKAI) No. 4-118,030 ( has the catalyst carrier layer which is formed of mordenite. The mordenite exhibits an HC absorbing ability. However, the exhaust gas purifying catalyst was found to have the following disadvantages when the exhaust gas purifying catalyst was tested under the following testing conditions:

a 10%-fuel-lean air-fuel mixture was combusted in an automobile engine;

the resultant exhaust gas included NO in an amount of 250 ppm, HC in an amount of 1,000 ppmC (a value converted into a carbon content), $O_2$ in a amount of 10% by volume, CO in an amount of 150 ppm, $CO_2$ in an amount of 6.5% by volume, and the balance of $N_2$; and the exhaust gas flowed at an SV (i.e., space velocity) of 67,000 $hr^{-1}$. As illustrate in FIGS. 10 (A) and 10 (B), the exhaust gas purifying catalyst exhibited an increasing conversion against HC included in an exhaust gas. The HC conversion increased to 100% as the temperature of the exhaust gas elevated. On the contrary, the exhaust gas purifying catalyst exhibited a decreasing conversion against NOx, included in the exhaust gas, as the temperature of the exhaust gas elevated.

The disadvantageous phenomena are believed to occur as follows. The released HC is effected to preferentially carry out their own oxidizing reactions by the catalyst ingredient. As a result, the reducing reactions of $NO_x$ are less likely to take place.

In this instance, even if HC are supplied from an upstream side of an exhaust gas flow as illustrated in FIG. 11, HC cannot be utilized effectively to purify $NO_x$ in an elevated temperature range. This drawback is believed to be caused by the following mechanism. In an elevated temperature range, HC have been oxidized independently around the surface of the catalyst carrier layer 2, and cannot be diffused into the inner side of the catalyst carrier layer 2.

SUMMARY OF THE INVENTION

The present invention has been developed in view of the aforementioned circumstances. It is an object of the present invention to provide an exhaust gas purifying catalyst which can purify HC and $NO_x$ with high conversions, respectively, over a wide temperature range.

A catalyst for purifying an exhaust gas according to the present invention can carry out the object, and comprises:

a substrate;

a catalyst carrier layer formed on the substrate;

a catalyst ingredient loaded on the catalyst carrier layer; and means for supplying hydrocarbons into the catalyst carrier layer, the means disposed in the substrate.

According to the present invention, the hydrocarbons supplying means supplies supplementary hydrocarbons to the catalyst carrier layer within the present exhaust gas purifying catalyst. Accordingly, the supplementary hydrocarbons are supplied into the catalyst carrier layer regardless of a temperature rage to which the present exhaust gas purifying catalyst is subjected. Thus, even when an exhaust gas is of a fuel-lean atmosphere (or an oxygen-rich atmosphere), the atmosphere can be kept to the stoichiometric point around the active cites of the present exhaust gas purifying catalyst. As a result, the present exhaust gas purifying catalyst can not only purify HC, included in the exhaust gas, with a high conversion continuously over a wide temperature range. Simultaneously therewith, the present exhaust gas purifying catalyst can purify $NO_x$, included in the exhaust gas, with a high conversion consistently over a wide temperature range, because the $NO_x$, included inn the exhaust gas, are securely reacted with the supplementary hydrocarbons, which are supplied by the hydrocarbons supplying means.

As having described so far, the present exhaust gas purifying catalyst can not only purify HC, included in the exhaust gas, with a high conversion over a wide temperature range, but also purify $NO_x$, included in the exhaust gas, with a high conversion over a wide temperature range.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 8 illustrates HC and $NO_x$ conversions which were exhibited by the exhaust gas purifying catalyst of the First Preferred Embodiment wherein:

FIG. 8 (A) is a graph for illustrating the HC and $NO_x$ conversions when a temperature of an exhaust gas was increased; and FIG. 8 (B) is a graph for illustrating the HC and $NO_x$ conversions when a temperature of an exhaust gas was decreased;

FIG. 10 illustrates HC and $NO_x$ conversions which were exhibited by the conventional exhaust gas purifying catalyst disclosed in Japanese Unexamined Patent Publication (KOKAI) No. 4-118,030, wherein:

FIG. 10 (A) is a graph for illustrating the HC and $NO_x$ conversions when a temperature of an exhaust gas was increased.

DETAILED DESCRIPTION OF THE PREFERRED EMBODIMENTS

Figure 1A:
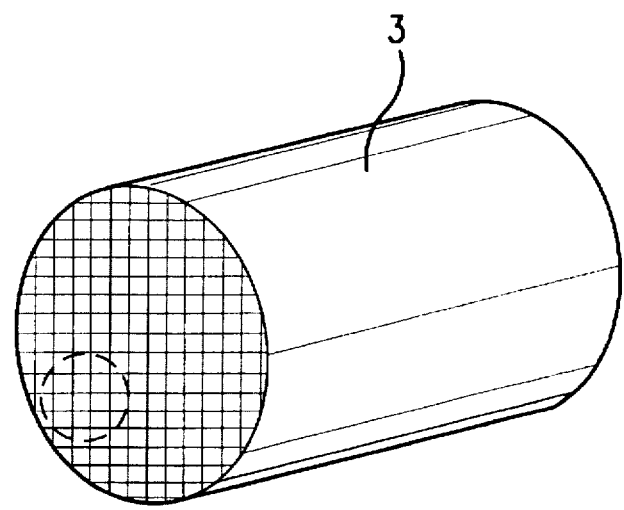
FIG. 1 is a perspective view of an exhaust gas purifying catalyst of a First Preferred Embodiment according to the present invention, and a partly enlarged plan view thereof.

Having generally described the present invention, a further understanding can be obtained by reference to the specific preferred embodiments which are provided herein for purposes of illustration only and are not intended to limit the scope of the appended claims.

In the present exhaust gas purifying catalyst, the substrate can be a honeycomb-shaped substance, a pellet-shaped substance, or the like. The substrate can be formed of cordierite, heat-resistant metal, or the like.

The catalyst carrier layer can preferably be formed of a substance which adsorbs hydrocarbons in a large amount. As a result, the supplementary hydrocarbons, supplied by the hydrocarbons supplying means, can reside in the resultant catalyst carrier layer as long as possible. For example, such a substance can be a porous substance which is formed of alumina, zeolite, zirconia, a composite oxide of silica and alumina, titania, or the like. The catalyst carrier layer can preferably be formed in an amount of from 60 to 240 grams with respect to 1 liter of the substrate. Note that it is possible to make a honeycomb-shaped substrate or a pellet-shaped substrate from these materials themselves.

As for the catalyst ingredient, it is possible to employ at least one member selected from the group consisting of noble metals, such as, platinum (Pt), palladium (Pd), rhodium (Rh), an iridium (Ir). Pt or Pd can preferably be loaded on the catalyst carrier layer in an amount of from 0.1 to 5 grams with respect to 1 liter of the substrate. Rh can preferably be loaded on the catalyst carrier layer in a amount of from 0.01 to 3 grams with respect to 1 liter of the substrate. In particular, when the combination of Rh and Pt or Pd is loaded, the loading amount of Rh with respect to Pt or Pd can preferably be 1/1 or less, further preferably fall in a range of from 1/20 to 1/2. Ir can preferably be loaded on the catalyst carrier layer in an amount of from 0.01 to 4 grams with respect to 1 liter of the substrate.

As for the supplementary hydrocarbons, supplied by the hydrocarbons supplying means, it is possible to utilize a light oil. The supplementary hydrocarbons can preferably be supplied into the catalyst carrier layer at a flow of from $1 \times 10^{-5}$ to $1 \times 10^{-3}$ m$^3$ per hour.

Moreover, a noble metal ingredient loading chemical can preferably be injected into the hydrocarbons supplying means in order to load the catalyst ingredient on the catalyst carrier layer. If such is the case, the present exhaust gas purifying catalyst can be furthermore enhanced in terms of the $NO_x$ purifying activity, because the catalyst ingredient is loaded adjacent to the hydrocarbons supplying means.

First and Second Preferred Embodiments embody the present invention, and will be hereinafter described in detail with reference to the accompanied drawings.

First Preferred Embodiment

An exhaust gas purifying catalyst of the First Preferred Embodiment embodies the present invention by utilizing a ceramic substrate.

Figure 1B:
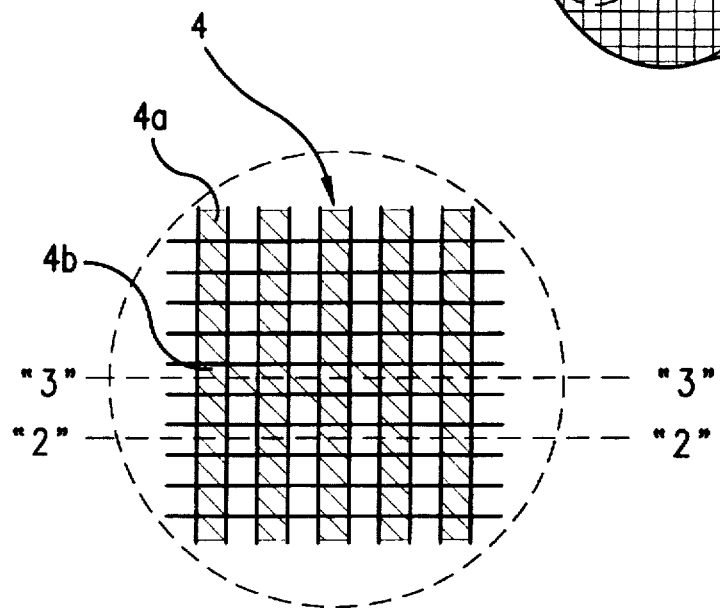
Figure 2:
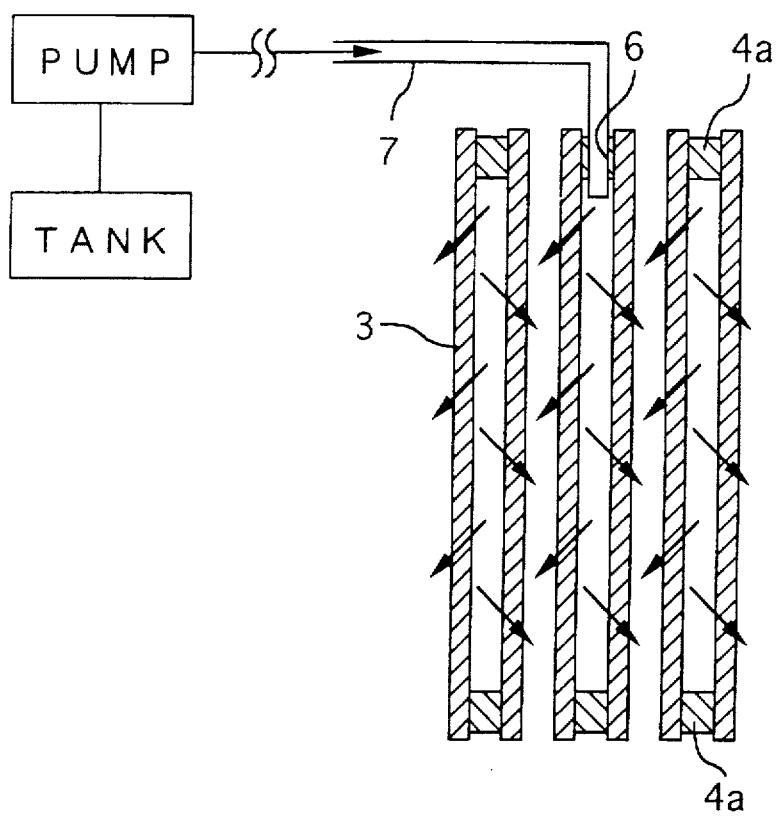
FIG. 2 is concerned with the exhaust gas purifying catalyst of the First Preferred Embodiment, and is a cross-sectional view taken along line "2"—"2" of FIG. 1.
Figure 3:
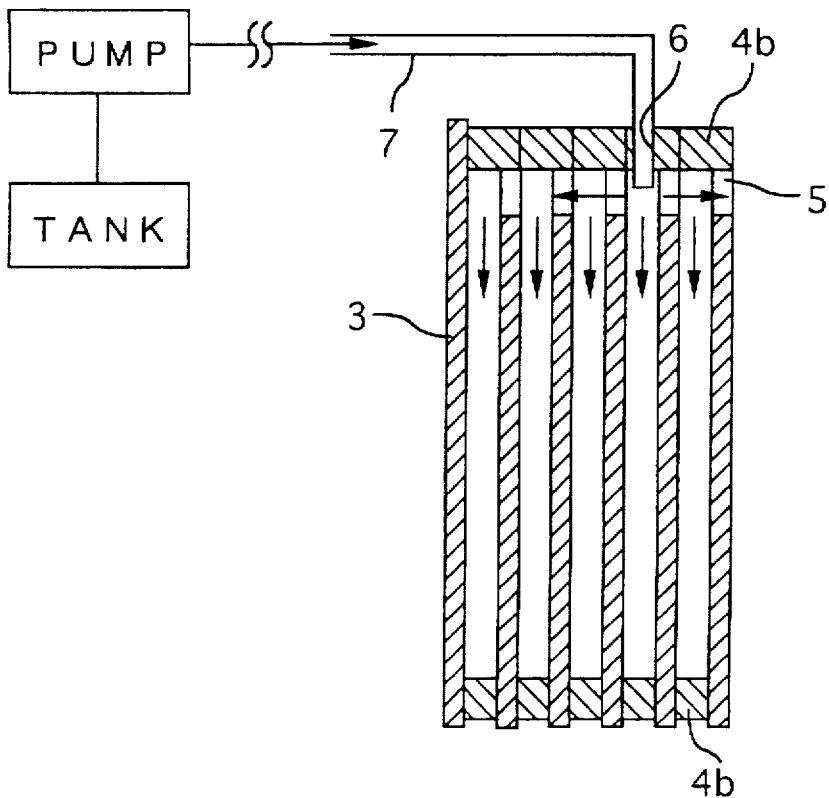
FIG. 3 is concerned with the exhaust gas purifying catalyst of the First Preferred Embodiment, and is a cross-sectional view taken along line "3"—"3" of FIG. 1.

First of all, a honeycomb-shaped substrate or a ceramic substrate was prepared. The honeycomb-shaped substrate was formed of commercially available cordierite, or the like. Then, a catalyst carrier layer was formed on the cellular walls of the honeycomb-shaped substrate, thereby completing a honeycomb-shaped member 3. The catalyst carrier layer was formed of γ-alumina, or the like, and was coated in an amount of 180 grams with respect to 1 liter of the honeycomb-shaped substrate. Further, as illustrated in FIG. 1, cellular plugs 4 are formed on the upstream and downstream sides of the honeycomb-shaped member 3. The cellular plugs 4 included a plurality of vertical cellular plugs 4a, and a horizontal cellular plug 4b. As illustrated in FIGS. 1 and 2, the vertical cellar plugs 4a were formed to plug every other rows of vertical cells parallelly. As illustrated in FIG. 3, on the upstream and downstream side of the honeycomb-shaped member 3, one and only horizontal cellular plug 4b was formed to plug a row of horizontal cells in a direction perpendicular to the vertical cellular plugs 4a. Furthermore, a through hole 5 was formed through a cellular wall in rear of the upstream-side horizontal cellular plug 4b. Note that the through hole 5 was not opened in the side surface of the honeycomb-shaped member 3. Moreover, as illustrated in FIGS. 2 and 3, an aperture 6 was formed at a crossing position where one of the upstream-side vertical cellular plugs 4a cross the upstream-side horizontal cellular plug 4b. In addition, a pipe 7 was fixed into the aperture 6.

Then, a known catalyst ingredient loading chemical was injected into the honeycomb-shaped member 3 by way of the pipe 7. Except the injection of the catalyst ingredient loading chemical, a catalyst ingredient was loaded on the catalyst carrier layer, which was formed on the cellular walls of the honeycomb-shaped member 3, by a known loading process. The catalyst ingredient included noble metals, such as Pt, Pd and Rh. Pt was loaded on the catalyst carrier layer in an amount of 1.5 grams with respect to 1 liter of the honeycomb-shaped substrate. Pd was loaded on the catalyst carrier layer in an amount of 0.5 grams with respect to 1 liter of the honeycomb-shaped substrate. Rh was loaded on the catalyst carrier layer in an amount of 0.2 grams with respect to 1 liter of the honeycomb-shaped substrate. The exhaust gas purifying catalyst of the First Preferred Embodiment was thus prepared. The resultant exhaust gas purifying catalyst was held in a catalyst container, thereby completing a monolithic catalyst converter. Finally, the pipe 7 was connected with a pump, and the pump was connected to a tank. The tank held a flight oil which was utilized as a source of the supplementary hydrocarbons to be supplied. The supplementary hydrocarbons were supplied in the exhaust gas purifying catalyst of the First Preferred Embodiment at a flow of $1 \times 10^{-4}$ m$^3$ per hour. Note that the cellular plug 4, the through hole 5, the pipe 7, the pump and the tank constitute the means for supplying hydrocarbons in the exhaust gas purifying catalyst of the First Preferred Embodiment.

(Examination and Evaluation)

Figure 8A:
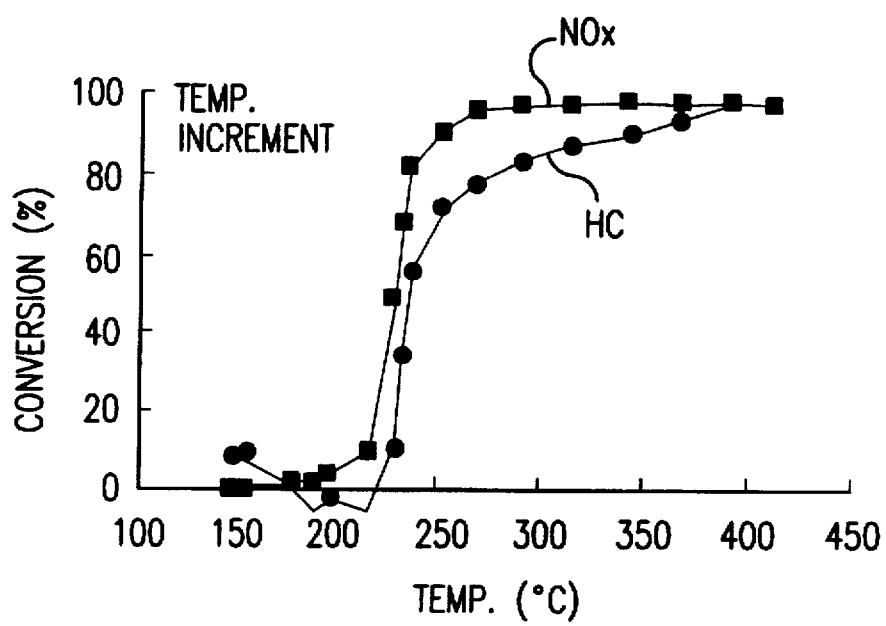
Figure 8B:
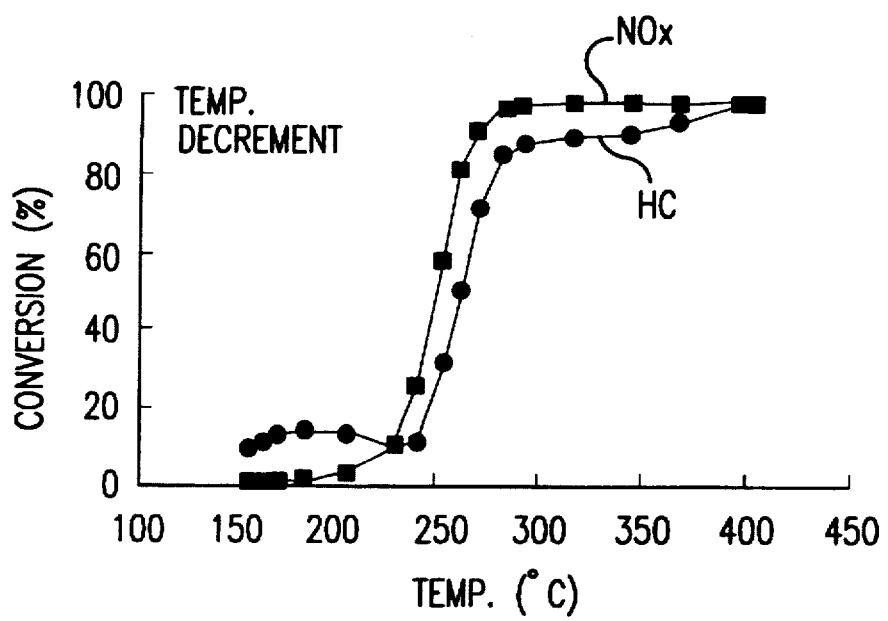

The resulting monolithic converter, which employed the exhaust gas purifying catalyst of the First Preferred Embodiment, was examined for the HC and $NO_x$ conversions under the same 10%-fuel-lean testing conditions as the conventional exhaust gas purifying catalyst, for instance, the one proposed in Japanese Unexamined Patent Publication (KOKAI) No. 4-118,030, was examined. FIGS. 8(A) and 8(B) illustrate the results of the evaluation.

It is appreciated from FIGS. 8(A) and 8(B) that the monolithic converter exhibited increasing conversions against HC and $NO_x$, included in the exhaust gas, as the temperature of the exhaust gas increased. The HC and $NO_x$ conversions eventually reached 100%.

Figure 9:
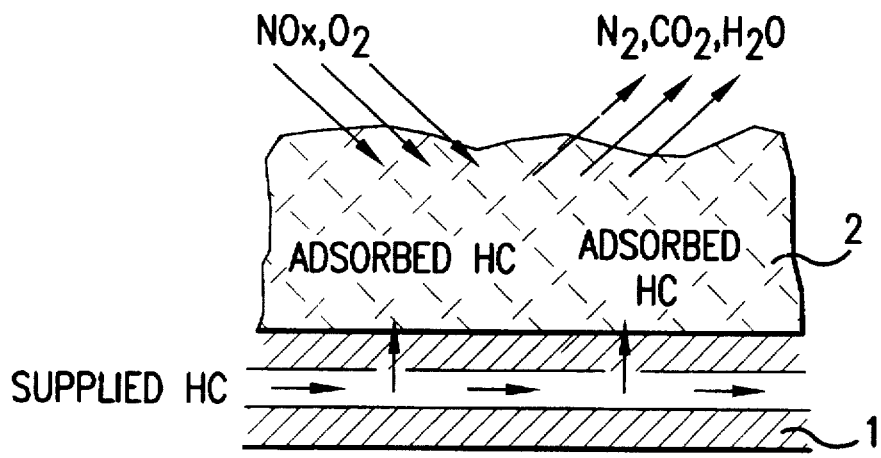
FIG. 9 is a schematic cross-sectional view for illustrating how $NO_x$ are purified by the exhaust gas purifying catalyst of the First Preferred Embodiment.
Figure 11:
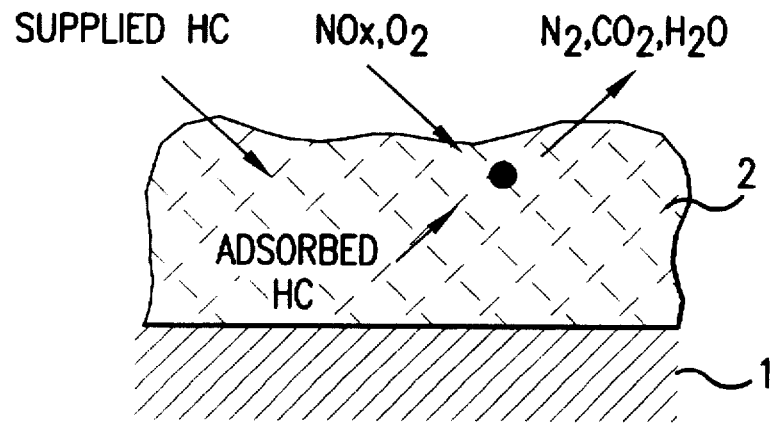
FIG. 11 is a schematic cross-sectional view for illustrating how $NO_x$ are purified by the conventional exhaust gas purifying catalyst.
Figure 10A:
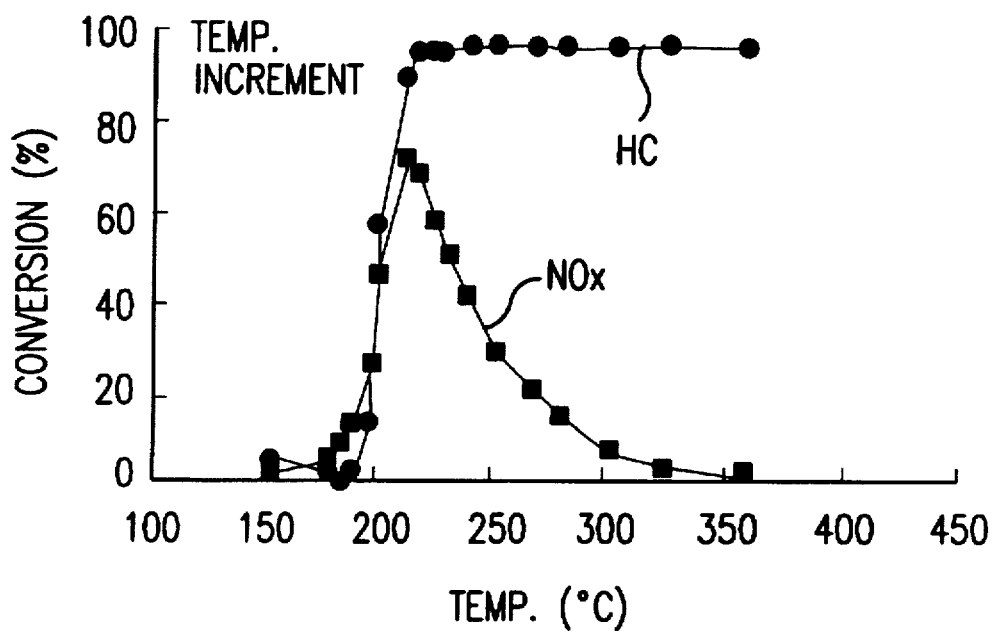
Figure 10B:
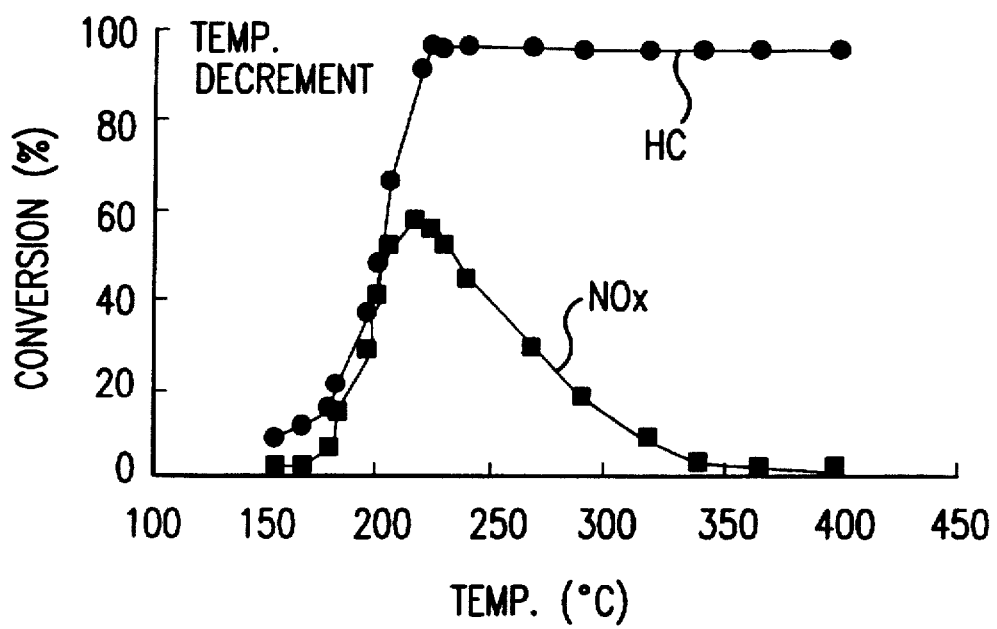
FIG. 10(B) is a graph for illustrating the HC and $NO_x$ conversions when a temperature of an exhaust gas was decreased.

The monolithic catalyst converter effected the advantages, because the supplementary hydrocarbons were supplied into the honeycomb-shaped member 3, and because the supplied supplementary hydrocarbons were conveyed into the catalyst carrier layer 2 from the side of the substrate 1 as illustrated in FIG. 9. Thus, the supplementary hydrocarbons were supplied into the catalyst carrier layer 2 regardless of the exhaust gas temperature range. As a result, even when the exhaust gas was of a fuel-lean atmosphere, the atmosphere could be kept to the stoichiometric point around the active cites of the exhaust gas purifying catalyst of the First Preferred Embodiment.

The monolithic catalyst converter could purify HC, included in the exhaust gas, with a high conversion continuously over a wide temperature range. In addition, it could also purify $NO_x$, included in the exhaust gas, with a high conversion continuously over a wide temperature range, because the supplementary hydrocarbons, supplied by way of the pipe 7, etc., reacted with the $NO_x$ securely.

Second Preferred Embodiment

An exhaust gas purifying catalyst the Second Preferred Embodiment embodies the present invention by utilizing a metallic substrate.

Figure 4:
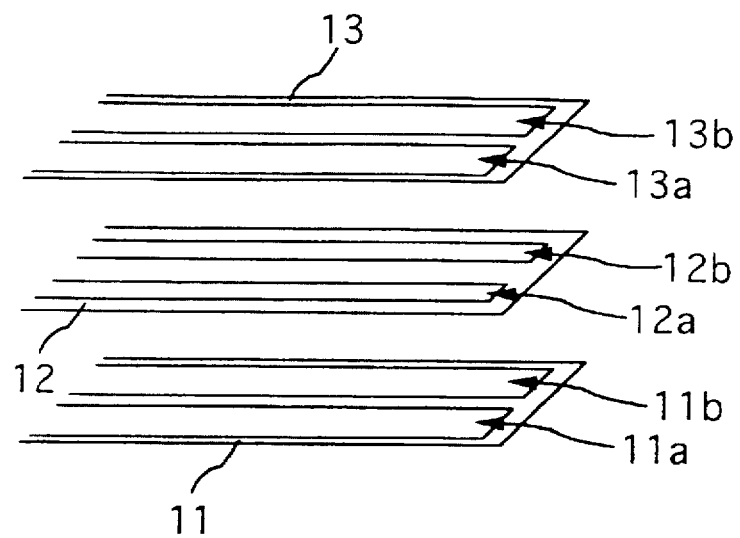
FIG. 4 is concerned with an exhaust gas purifying catalyst of a Second Preferred Embodiment according to the present invention, and is a perspective view of flat plates for constituting a substrate of the exhaust gas purifying catalyst.

At first, three flat plates were prepared: namely; a lower flat plate 11, an intermediate flat plate 12, and an upper flat plate 13 layer were prepared. As illustrated in FIG. 4, the lower flat plate 11 had two rows of perforation groups 11a and 11b which were disposed in a lengthwise direction. Likewise, the upper flat plate 13 had two rows of perforation groups 13a and 13b which were formed in a lengthwise direction. The perforation groups 11a, 11b, 13a and 13b included pores whose diameter fell in a range of from 0.01 to 2.00 mm. The intermediate flat plate 12 had cut-offs 12a and 12b. The cut-offs 12a and 12b were opened in a thickness-wise direction of the intermediate flat plate 12, and were disposed on positions, which corresponded to the perforation groups 11a, 11b, 13a and 13b, parallelly in a lengthwise direction thereof. The three flat plates 11, 12 and 13, and the corrugated plate 15 had a thickness of 0.04 mm, respectively. Note that the three flat plates 11, 12 and 13, and the corrugated plate 15 can preferably have a thickness of from 0.02 to 0.08 mm, respectively.

Figure 5:
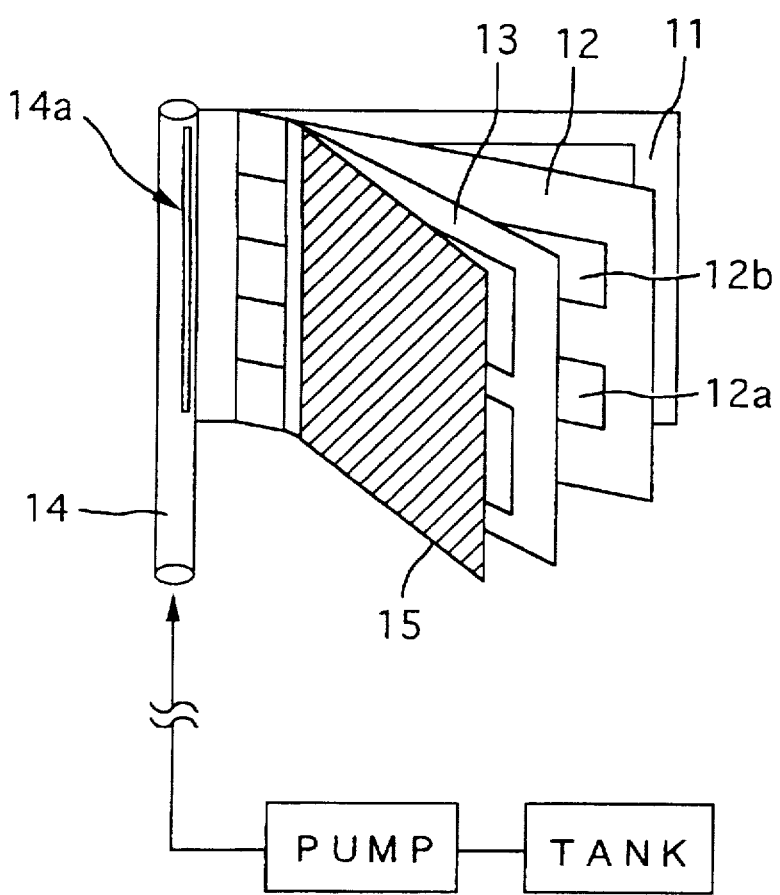
FIG. 5 is a perspective view for illustrating an assembly state of the exhaust gas purifying catalyst of the Second Preferred Embodiment.
Figure 6:
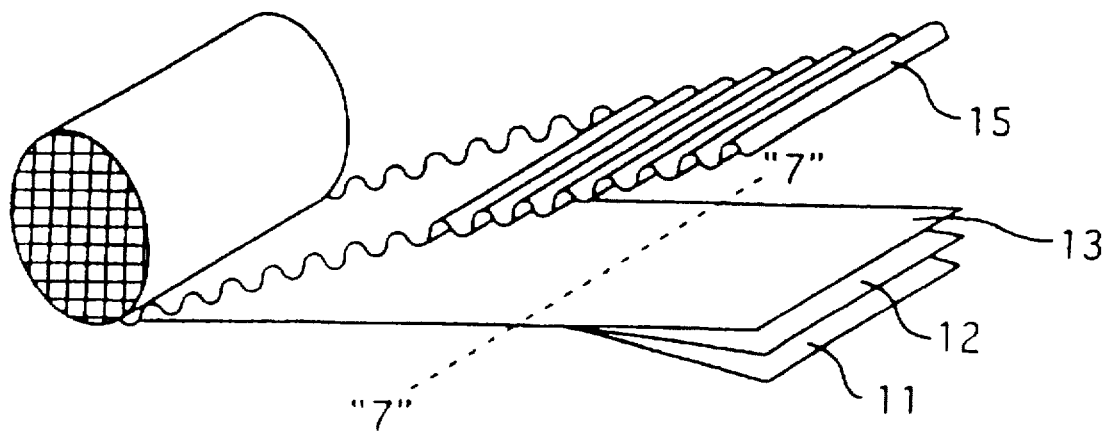
FIG. 6 is a perspective view for illustrating another assembly state of the exhaust gas purifying catalyst of the Second Preferred Embodiment.

Further, as illustrated in FIG. 5, a pipe 14, and a known corrugated plate 15 were prepared. The pipe 14 had a slit 14a extending in an axial direction thereof. Then, as illustrated in FIG. 6, a set of the three flat plates (i.e., the lower, intermediate and upper plates) 11, 12 and 13, and the corrugated plate 15 were wound around the pipe 14. The resultant cylindrical sub-assembly was put into an outer cylindrical housing, thereby completing a metallic substrate.

Figure 7:
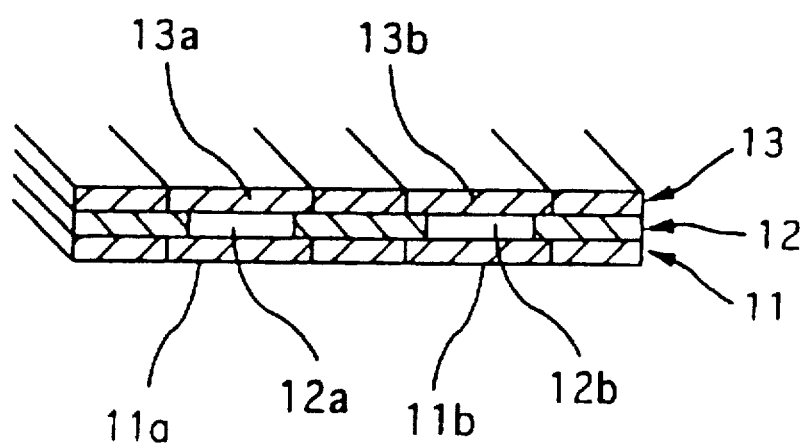
FIG. 7 is concerned with the exhaust gas purifying catalyst of the Second Preferred Embodiment, and is a cross-sectional view taken along line "7"—"7" of FIG. 6.

Furthermore, a catalyst carrier layer was formed on the cellular walls of the metallic substrate by a known method. The catalyst carrier layer was formed of γ-alumina, for example, and was coated in an amount of 180 grams with respect to 1 liter of the metallic substrate. Thereafter, a catalyst ingredient was loaded on the catalyst carrier layer by a known loading process. The catalyst ingredient included noble metals, such as Pt, Pd and Rh. Pt was loaded on the catalyst carrier layer in an amount of 1.5 grams with respect to 1 liter of the metallic substrate. Pd was loaded on the catalyst carrier layer in an amount of 0.5 grams with respect to 1 liter of the metallic substrate. Rh was loaded on the catalyst carrier layer in an amount of 0.2 grams with respect to 1 liter of the metallic substrate. The exhaust gas purifying catalyst of the Second Preferred Embodiment was thus prepared. The resultant exhaust gas purifying catalyst was held in a carrier catalyst container, thereby completing a monolithic catalyst converter. Finally, the pipe 14 was connected with a pump, and the pump was connected to a tank. The tank held a light oil which was utilized as a source of the supplementary hydrocarbons to be supplied. The supplementary hydrocarbons were supplied in the exhaust gas purifying catalyst of the Second Preferred Embodiment at a flow of $1 \times 10^{-4}$ m$^3$ per hour. Note that, as can be appreciated from FIG. 7, the perforation groups 11a, 11b, 13a and 13b, the cut-offs 12a and 12b, the pipe 14, the slit 14a, the pump and the tank constitute the means for supplying hydrocarbons in the exhaust gas purifying catalyst of the Second Preferred Embodiment.

The thus arranged monolithic catalyst converter could also operate and effect the advantages in the same manner as the First Preferred Embodiment, because the supplementary hydrocarbons, which were pumped out of the tank, were supplied into the catalyst carrier layer by way of the pump and the pipe 14 within the exhaust gas purifying catalyst of the Second Preferred Embodiment.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying an exhaust gas, comprising:

a substrate;

a catalyst carrier layer formed on said substrate;

a catalyst ingredient loaded on said catalyst carrier layer; and means for supplying hydrocarbons into said catalyst carrier layer, the supplying hydrocarbons means disposed inside said substrate, wherein the supplied hydrocarbons from inside of said substrate is conveyed to the catalyst carrier layer to contact the catalyst ingredient on the catalyst carrier layer.

2. The catalyst according to claim 1, wherein said substrate is a honeycomb-shaped substrate having a plurality of cells, an upstream side and a downstream side.

3. The catalyst according to claim 1, wherein said substrate is formed of at least one member selected from the group consisting of cordierite and heat-resistant metal.

4. The catalyst according to claim 1, wherein said catalyst carrier layer is formed of a substance which adsorbs hydrocarbons.

5. The catalyst according to claim 4, wherein said substance is a porous substance which is formed of at least one member selected from the group consisting of alumina, zeolite, zirconia, a composite oxide of silica and alumina and titania.

6. The catalyst according to claim 1, wherein said catalyst ingredient is at least one member selected from the group consisting of platinum (Pt), palladium (Pd), rhodium (Rh) and iridium (Ir).

7. The catalyst according to claim 1, wherein said hydrocarbons supplying means supplies an oil as the hydrocarbons.

8. A catalyst for purifying an exhaust gas, comprising:

a honey comb-shaped substrate having a plurality of cells, an upstream side and a downstream side;

a catalyst carrier layer formed on the honey comb-shaped substrate;

a catalyst ingredient loaded on the catalyst carrier layer; and means for supplying hydrocarbons into the catalyst carrier layer, the supplying hydrocarbons means disposed in the honey comb-shaped substrate, wherein the supplied hydrocarbons contact the catalyst ingredient on the catalyst carrier layer, and wherein said hydrocarbons supplying means comprises:

cellular plugs disposed on the upstream and downstream sides of the honeycomb-shaped substrate, the cellular plugs including a plurality of vertical cellular plugs formed to plug every other rows of vertical cells; and an upstream side horizontal cellular plug formed to plug a row of horizontal cells in a direction perpendicular to the vertical cellular plugs;

a through hole formed through a cellular wall in the upstream-side horizontal cellular plug;

an aperture formed at a crossing position where one of the vertical cellular plugs cross the upstream-side horizontal cellular plug;

a pipe fitted into the aperture;

a pump connected with the pipe; and a tank connected to the pump, the tank holding the hydrocarbons therein, wherein the pump draws the hydrocarbons from the tank, through the pipe and into the catalyst.

9. A catalyst for purifying an exhaust gas, comprising:

a substrate;

a catalyst carrier layer formed on the substrate;

a catalyst ingredient loaded on the catalyst carrier layer; and means for supplying hydrocarbons into the catalyst carrier layer, the supplying hydrocarbons means disposed in the substrate wherein the supplied hydrocarbons contact the catalyst ingredient on the catalyst carrier layer, wherein said hydrocarbons supplying means comprises:

a pipe having an axial slit;

a set of flat plates wound around the pipe, the set of flat plates including a lower flat plate having a perforation group, the perforation group including a plurality of pores and formed in a lengthwise direction of the lower flat plate;

an intermediate flat plate superimposed on the lower flat plate, and having a cut-off, the cut-off opened in a thickness-wise direction of the intermediate flat plate and disposed on a position corresponding to the perforation group of the lower flat plate; and an upper flat plate superimposed on the intermediate flat plate, and having a perforation group, the perforation group including a plurality of pores, formed in a lengthwise direction of the upper flat plate and disposed on a position corresponding to the cut-off of the intermediate flat plate;

a corrugated plate disposed between the pipe and the set of the flat plates;

a pump connected with the pipe; and a tank connected to the pump, the tank holding the hydrocarbons therein, wherein the pump draws the hydrocarbons from the tank, through the pipe and into the catalyst.

* * * * *